United States Patent
Bormann

(10) Patent No.: US 8,888,939 B2
(45) Date of Patent: Nov. 18, 2014

(54) METHOD OF APPLYING AN ANNULAR STRIP TO A TIRE

(71) Applicant: The Goodyear Tire & Rubber Company, Akron, OH (US)

(72) Inventor: Rene Bormann, Schrondweiler (LU)

(73) Assignee: The Goodyear Tire & Rubber Company, Akron, OH (US)

(*) Notice: Subject to any disclaimer, the term of this patent is extended or adjusted under 35 U.S.C. 154(b) by 49 days.

(21) Appl. No.: 13/664,573

(22) Filed: Oct. 31, 2012

(65) Prior Publication Data

US 2014/0116601 A1    May 1, 2014

(51) Int. Cl.
| | | |
|---|---|---|
| *B29D 30/08* | (2006.01) | |
| *B29D 30/06* | (2006.01) | |
| *B60C 19/00* | (2006.01) | |
| *B29D 30/26* | (2006.01) | |
| *B60C 25/05* | (2006.01) | |
| *B29D 30/00* | (2006.01) | |

(52) U.S. Cl.
CPC ........ *B29D 30/08* (2013.01); *B29D 2030/0038* (2013.01); *B60C 19/002* (2013.04); *B29D 30/0061* (2013.01); *B29D 30/06* (2013.01); *B29D 30/0685* (2013.01); *B29D 30/2607* (2013.01); *B29D 2030/0686* (2013.01); *B29D 2030/0695* (2013.01); *B60C 25/0509* (2013.04)
USPC .......................... 156/126; 156/123; 156/406.2

(58) Field of Classification Search
CPC .............. B29D 30/06; B29D 30/0061; B29D 30/2607; B29D 30/30; B29D 30/3014; B29D 30/0016; B29D 2030/0038; B60C 19/002
USPC ............................ 156/126, 293, 406.2, 421.8
See application file for complete search history.

(56) References Cited

U.S. PATENT DOCUMENTS

| | | | | |
|---|---|---|---|---|
| 3,147,864 | A | * | 9/1964 | Sylvester ........................ 211/24 |
| 3,935,948 | A | * | 2/1976 | Podojil ............................. 211/23 |
| 4,030,102 | A | * | 6/1977 | Kaplan et al. .................. 343/915 |
| 4,228,930 | A | * | 10/1980 | Hogan ........................... 222/212 |
| 4,738,738 | A | * | 4/1988 | Holroyd et al. ............... 156/129 |
| 6,039,825 | A | * | 3/2000 | Siegenthaler .................. 156/111 |
| 8,110,055 | B2 | * | 2/2012 | Sostmann et al. ............. 156/115 |
| 2003/0150544 | A1 | | 8/2003 | Naito et al. |
| 2008/0000576 | A1 | * | 1/2008 | Miller et al. ................... 156/166 |

FOREIGN PATENT DOCUMENTS

| | | | |
|---|---|---|---|
| DE | 202010005400 | 7/2010 | |
| EP | 2130668 | 12/2009 | |
| EP | 2199115 | 6/2010 | |
| JP | 10-217350 | * 8/1998 | ............. B29D 30/30 |
| JP | 2008-254338 | * 10/2008 | ............. B29D 30/06 |
| JP | 2010-58270 | * 3/2010 | ............. B29D 30/26 |

OTHER PUBLICATIONS

Machine generated English language translation of JP 2010-58270 (original document dated Mar. 2010).*
Machine generated English language translation of JP 2008-254338 (original document dated Oct. 2008).*
Machine generated English language translation of JP 10-217350 (original document dated Aug. 1998).*

* cited by examiner

*Primary Examiner* — Martin Rogers
(74) *Attorney, Agent, or Firm* — David L King

(57) ABSTRACT

The present application is directed to a method for applying a flexible annular strip to a radially inward oriented surface of a tire. Moreover, the present invention is directed to a corresponding apparatus for carrying out the above method.

6 Claims, 10 Drawing Sheets

METHOD OF APPLYING AN ANNULAR STRIP TO A TIRE

FIELD OF THE INVENTION

The present invention is directed to a method of applying an annular strip to a tire, in particular a method of applying an annular foam strip to an innerliner of a tire.

BACKGROUND OF THE INVENTION

Government regulations and consumer preferences continue to require a reduction in the acceptable noise levels produced from the tires of passenger vehicles. One source of such noise is resonance within the air chamber enclosed by the innermost surface of the tire and the rim. One type of effort to reduce tire noise is damping the sound from the air vibration in the air chamber, which efforts have focused mainly on altering the innermost surface of the tire adjacent the tire carcass. Shortcomings in these previous efforts, as well as new stricter regulations regarding noise reduction, have provided a need for further improvements to the tire to reduce sound transmission due to vibrations within the air chamber.

Typically, carcasses of pneumatic green tires are built as a series of layers of flexible high modulus cords encased in a low modulus rubber wherein an innerliner is positioned to form the innermost surface of the tire. The green tire is cured in a curing press using a curing bladder, which forces expansion of the tire. During curing, the innerliner expands with the carcass, which is forced against the indentations in the curing mold to form the tread of the tire, and all components are co-cured so as to provide a substantially cohesive bond between one another.

U.S. Patent Application 2011/0308706 A1 discloses a method for making a pneumatic tire with a foam noise damper. According to this method a silicone rubber foam noise damper is adhered to the inner liner of a green tire and is covered with a barrier layer. After curing the barrier layer is removed to uncover the foam noise damper.

U.S. Patent Application 2003/0041942 A1 discloses another method of applying a noise damper to a pneumatic tire. In particular, an elastic band comprising one or more flaps is put around the wheel rim.

A challenge has been presented to provide a closed annular strip to a radially inward oriented surface of a tire.

A further challenge has been presented to provide a method of attaching an annular strip to a radially inward oriented surface which requires less manual steps.

A further challenge has been presented to provide an annular strip fitting an inner diameter of a tire.

Another challenge has been presented to apply an annular strip to a tire's innerliner which is reliable and repeatable with high quality in mass production.

DISCLOSURE OF THE INVENTION

The present invention is directed to a method for applying a flexible annular strip to a radially inward oriented surface of a tire. In particular, the strip may be applied to an innerliner of the tire. According to the method, a plurality of segments is arranged about a central axis, each segment being movable between a collapsed radial position and an expanded radial position and having a radial outer surface for supporting at least a part of a length of the annular strip. Further, a plurality of fingers arranged about the central axis and extending in an axial direction is provided, wherein each finger is movable between an inner radial position and an outer radial position, and wherein each angular area between two circumferentially neighboring segments is provided with one of the fingers. In a further step the annular strip is placed about the radially outer surfaces of the expandable segments. Moreover, excess lengths of the annular strip are placed between two circumferentially neighboring segments about a radially inner surfaces of the fingers provided in the angular areas between these neighboring segments. Then the plurality of fingers and the plurality of segments supporting the annular strip are inserted into the tire's rim diameter and each segment is expanded in an outer radial direction such that the annular strip is pressed via the segments against the radially inward oriented surface of the tire.

According to an aspect of the present invention, the fingers are retracted before the segments press the strip onto the inner surface of the tire.

According to another aspect of the invention, the fingers are retracted in a direction having at least one component in an axial direction. For example, the fingers may be tiltable in an axial direction or may be withdrawn in an axial direction.

According to still another aspect of the invention, the fingers are biased towards the central axis. In other words, if the segments are moved in an outer radial direction they may exert a force on the fingers via the annular strip so as to deflect the fingers against resilient means.

According to still another aspect of the invention, after pressing the annular strip with the segments against the inner surface of the tire, the plurality of expandable segments are rotated about the tire's axis to press excess lengths of the annular strip against the inward oriented surface of the tire.

According to still another aspect of the invention, after pressing the annular strip with the segments against the inner surface of the tire, the plurality of expandable segments are at least partially retracted or collapsed and then rotated about the tire's axis such that upon another expansion of the segments, these segments press excess lengths of the annular strip against the inward oriented surface of the tire.

According to yet another aspect of the invention an adhesive is applied to the inner surface of the tire before pressing the annular strip with the expandable segments against that surface or, alternatively, an adhesive is applied to the strip before placing the strip about the radially outer surfaces of the expandable segments.

According to another aspect of the invention, each segment comprises an outwardly curved sheet for supporting the annular strip.

According to another aspect of the invention, the sheet is made of metal, e.g. steel, or plastic material.

According to another aspect of the invention, the curvature of the sheet is adapted to the circumferential curvature of the inner surface of the tire or of the inner circumference of the innerliner.

According to another aspect of the invention, each segment consists of at least one roll rotatable about an axial direction.

According to still another aspect of the invention, each expandable segment consists of at least two parallel rolls, each roll being rotatable about an axial direction.

According to still another aspect of the invention, the annular strip is a foam strip, in particular a solid foam strip.

According to still another aspect of the invention, the annular strip is one or more of the following: formed integrally; formed by a band having two ends glued to each other before being placed on the expandable segments; formed by a band having two ends fused together before being placed on the expandable segments.

According to still another aspect of the invention, the segments are expanded or collapsed by actuator means being selected from one or more of: pneumatic, hydraulic or electric actuators.

According to still another aspect of the invention, the plurality of segments is arranged and adapted to be inserted in the collapsed position into the tire's rim diameter together with the annular strip supported by the outer radial surfaces of the expandable segments. In other words, the arrangement or the plurality of segments is inserted into the space defined by the toroidal tire cavity.

Further, the present invention may be directed to an apparatus for applying a flexible annular strip to a radially inward oriented surface of a tire, preferably according to the aforementioned method.

The apparatus may comprise a plurality of segments arranged about the apparatus' central axis, each segment being movable between a collapsed radial position and an expanded radial position with respect to the central axis. Each segment has a radial outer surface for supporting at least a part of a length of the annular strip. Moreover, the apparatus comprises a plurality of fingers arranged about the central axis and extending in a direction parallel to the axial direction, wherein each finger is movable between an inner radial position and an outer radial position with respect to the central axis, and wherein each angular area between two circumferentially neighboring segments is provided with one of the fingers. The apparatus may further comprise actuation means for moving or driving the segments between the expanded position and the collapsed position.

According to an aspect of the invention, the apparatus' fingers are biased towards the central axis.

According to another aspect of the invention, the fingers are retractable in a direction having at least one component parallel to the central axis.

According to another aspect of the invention, the segments consist of or comprise outwardly curved sheets.

According to another aspect of the invention, the segments consist of or comprise rolls having an axis parallel to the central axis.

According to another aspect of the invention, the annular strip consists of a (solid) foam. The foam may act as a noise damper or noise damping element.

According to an aspect of the invention, it is possible to apply a silicone adhesive to the tire's innerliner surface to form an adhesive prepared surface and to apply an annular foam strip or ring on that adhesive prepared surface. Optionally, the adhesive may be cured in a further step. Further, it is possible that a release agent is disposed on the innerliner surface and a silicone adhesive layer disposed on the release agent. Suitable release agents may e.g. include release agents selected from the group consisting of silicone release agents and polytetrafluoroethylene release agents.

According to another aspect of the invention, the annular strip may extend circumferentially about the inside of the tire and only partially across the width of the tire.

According to another aspect of the invention, the annular strip may extend axially no more than 50 percent of the tread width.

According to another aspect of the invention, the annular strip may extend axially in a range of from about 10 percent to 50 percent of the tread width.

According to another aspect of the invention, the annular strip may be substantially centered axially on the axial centerline of the tire or be centered with respect to the equatorial plane of the tire.

According to another aspect of the invention, multiple circumferential annular strips or rings may be disposed, for example, to equalize the load on the tire and maintain dynamic balance.

According to yet another aspect of the invention, the cross section profile of the annular strip is rectangular. Alternatively, the cross section profile of the ring represents 1 or 2 periods of a sine-type waveform on the side directed radially towards the tire air cavity and flat on the opposite side contacting the tire's inward surface.

According to another aspect of the present invention, the surface of the annular strip includes pyramids or cones directed radially towards the tire air cavity.

According to another aspect of the invention, the width of the annular strip is in a range of from 100 to 130 mm. In one embodiment, the width does not exceed a width calculated as: strip width=belt width−70 mm.

According to another aspect of the invention, the thickness, or gauge, of the annular strip or ring is in a range of from 15-30 mm, the gauge being a function of 1) tire cavity resonance damping, 2) maximum allowable weight of the damper when considering effects on tire performance, and 3) density of material.

According to another aspect of the invention, the annular strip or ring may include a splice which is closed prior to the installation of the ring by forming the ring from a band and gluing the endings together.

According to another aspect of the invention, the strip's thickness ranges from about 1 to about 80 and preferably about 10 to about 50 percent of the total tire thickness, depending somewhat upon the tire size and intended use of the tire with its structured volume being less than about 25 percent, preferably less than about 10 percent, of the encompassed volume of air in the pneumatic tire. Thus, a typical thickness is in the range of about 10 to about 30 percent of the total tire thickness for an ordinary passenger pneumatic tire with its volume being less than about 10 percent of the encompassed volume of air in the pneumatic tire. The mentioned values are of particular advantage if the ring consists of a solid foam material.

All features of the above described aspects of the invention may be combined or replaced with one another.

DEFINITIONS

"Apex" or "Bead Filler Apex" means an elastomeric filler located radially above the bead core and between the plies and the turnup plies.

"Axial" and "Axially" mean the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcing Belts" or "Belt" means at least two annular layers or plies of cords, woven or unwoven, underlying the tread.

"Casing" means the carcass, belt structure, beads, sidewalls and all other components of the tire excepting the tread and an undertread (if present), i.e., the whole tire.

"Circumferential" most often means circular lines or directions extending along or in parallel to the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"Innerliner" means a compound placed on the inner surface of a tubeless tire. Often an innerliner is formulated to resist air permeation.

"Lateral" means a direction parallel to the axial direction.

"Normal Load" means the specific design inflation pressure and load assigned by the appropriate standards organization for the service condition for the tire.

"Radial" and "Radially" mean directions radially toward or away from the axis of rotation of the tire.

"Sidewall" means that portion of a tire between the tread and the bead, or, in the context of the present disclosure, also a lateral boundary of a tread groove.

"Tread" means a molded, extruded, or shaped rubber component which, when bonded to a tire casing, includes that portion of the tire that comes into contact with the road when the tire is normally inflated and under normal load.

"Tread width" means the arc length of the tread surface in the plane including the axis of rotation of the tire.

BRIEF DESCRIPTION OF THE DRAWINGS

In the following, we briefly describe the figures according to the embodiments of the present invention. Further details are given in the detailed description of the embodiments. The Figures have the purpose of illustrating the invention and should not be understood in a limiting sense.

DETAILED DESCRIPTION OF THE EMBODIMENTS

Figure 1:
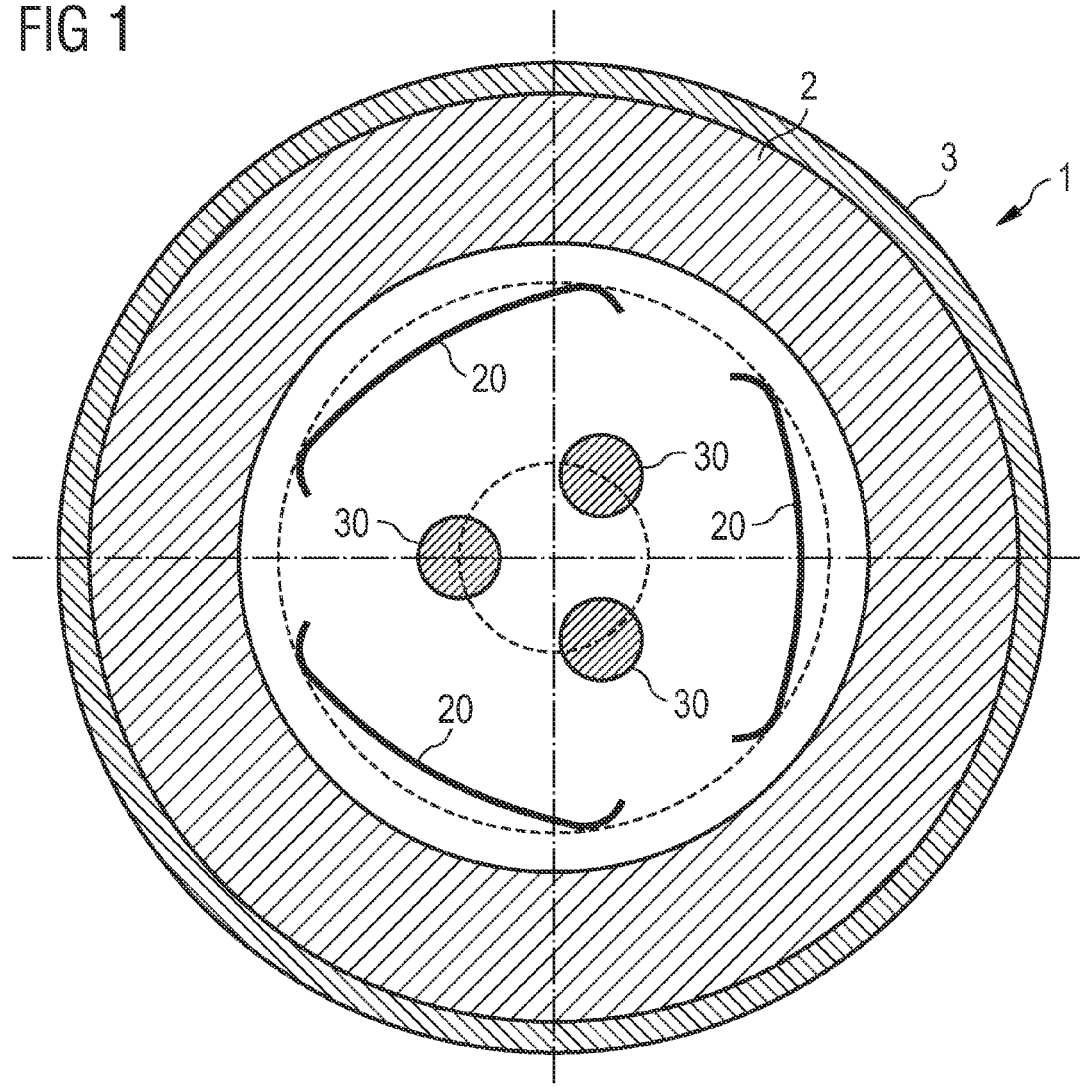
FIG. 1 is a schematic plan view of a tire into which segments and fingers according to an example of the invention have been inserted in an axial direction.

FIG. 1 shows a side view of a tire 1 having a tread 3 and a sidewall 2. Inside the tire's 1 rim diameter is positioned an assembly or arrangement comprising expandable segments 20 arranged about the tire's axis. Further, the assembly comprises axially extending fingers 30 wherein one finger 30 is arranged in each angular area or sector between two neighboring segments 20. The segments 20 are movable between a collapsed position, as shown in FIG. 1, and an expanded position as e.g. shown in FIGS. 2 and 3. Thus, the segments 2 are movable in a radial direction. In the collapsed position shown in FIG. 1, the largest diameter of the assembly fits into the depicted tire's rim diameter such that the assembly may be inserted in the space defined by the tire's innermost circumference. In particular, the assembly is used to place an annular strip or ring 10 on the inner surface of the tire, in particular onto the innerliner 5 (not shown in FIG. 1). Then, the largest diameter of the assembly (measured in a plane parallel to the tire's equatorial plane) is less than the tire's rim diameter plus two times the ring's thickness. Preferably, the actual diameter is less than 10% smaller or preferably only less than 5% smaller than the mentioned largest diameter.

As also depicted in FIG. 1, the segments 20 may have an outwardly bent or curved shape. Preferably, such a curvature is adapted to the inner circumferential curvature of the tire's innerliner (not shown in FIG. 1). Furthermore, the circumferential ends of the segments 20 may be bent towards an inner radial direction or even further. Thereby, the strip 10 may be prevented from potential damage. The segments 20 may be substantially arranged concentrically about the tire's main axis.

The depicted fingers 30 have a substantially cylindrical shape extending in an axial direction. The fingers 30 may also be arranged concentrically about the tire's main axis wherein the radial distance of the fingers 20 from the tire's main axis is preferably smaller than the radial distance of the segments 20 from that axis.

Figure 2:
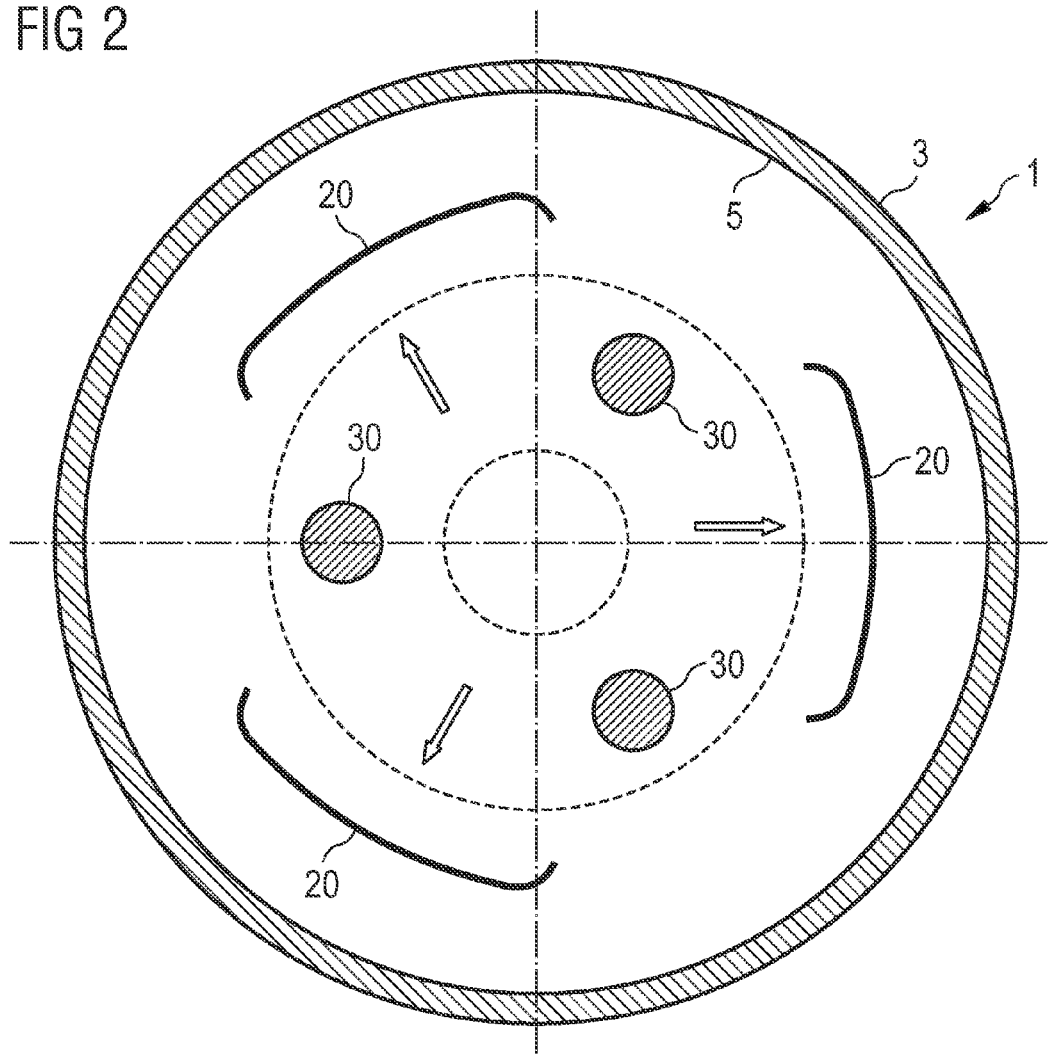
FIG. 2 is a schematic view of the arrangement of FIG. 1 wherein the segments and fingers have been expanded in an outer radial direction between both sidewalls of the tire (the sidewalls of the tire are not depicted for the sake of clarity)

FIG. 2 shows the arrangement of FIG. 1 in a partially expanded position wherein the tire's sidewall 2 is not depicted for the sake of clarity. In comparison with the state shown in FIG. 1, the segments 20 shown in FIG. 2 have been moved or expanded in an outer radial direction. Thus, the segments have been moved into the toroidal space defined by the tire's innerliner 5 or by the opposite sidewalls 2. Further, the fingers 30 have also been moved in an outer radial direction. The fingers 30 are still arranged on a circle having a smaller diameter than a concentric circle touching the segments 20. Preferably, the fingers are biased in a direction of the tire's axis such that they tension the annular strip placed on the segments 20. However, it is also possible that the fingers 30 are moved or driven by actuators, for example, without any biasing.

Figure 3:
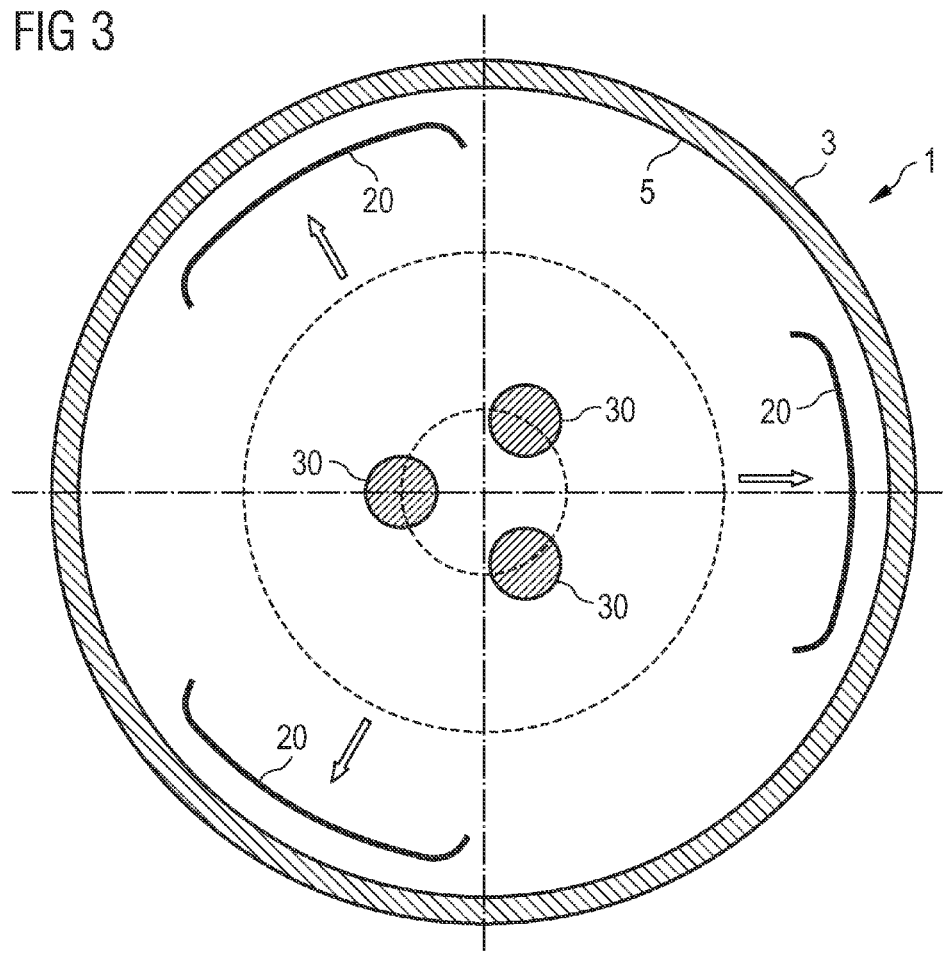
FIG. 3 is a schematic view of the arrangements of FIGS. 1 and 2 wherein the segments and fingers have been further expanded in an outer radial direction (sidewalls of the tire are not depicted)

FIG. 3 shows the arrangement according to FIGS. 1 and 2 in which the segments 20 have been further expanded in an outer radial direction. However, the fingers 30 have been retracted and are in a collapsed or partially collapsed position again, for example, in their initial position.

Movement of the segments 20 and/or fingers 30 may be provided by actuators and a corresponding control system. Such actuators may preferably be chosen from a group of hydraulic, pneumatic or electric actuators. For example linear actuators may be used. It is also possible that only one actuator actuates a transmission or gear elements driving at least some or all of the segments 20 and/or fingers 30.

Figure 4:
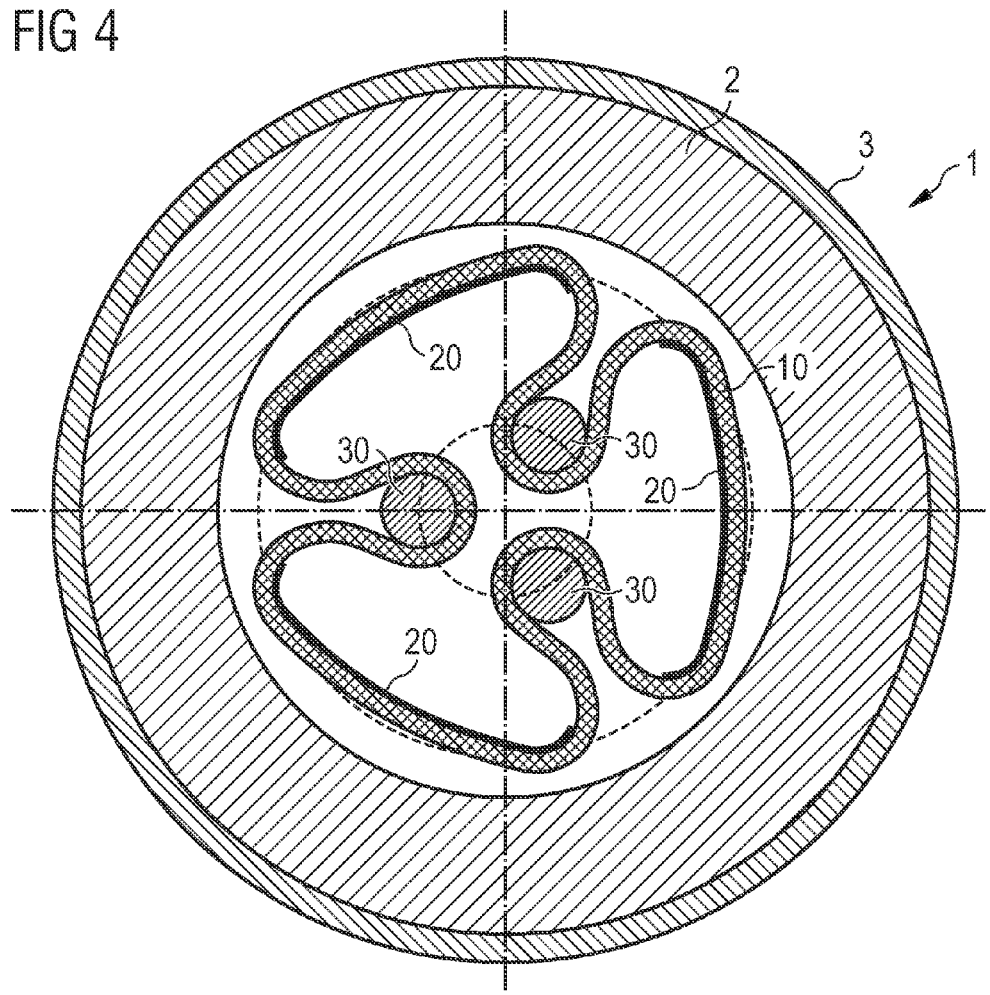
FIG. 4 is a schematic view of the arrangement of FIG. 1 with an annular strip or ring disposed on the outer radial surface of the segments, excess lengths of the ring are supported by inner radial surfaces of the fingers.

FIG. 4 depicts the position according to FIG. 1 with an annular strip or ring 10 placed on the outer radial surfaces of the segments 20. Preferably, the ring 10 has a radial outer diameter which essentially corresponds to that of the inner circumference of the tire 1 or the innerliner 5, respectively. As depicted in FIG. 4, the overall diameter of the assembly including the supported ring 10 measured in a radial direction or, in other words, in a plane parallel to the equatorial plane of the tire, is smaller than the tire's rim diameter such that the assembly including the ring 10 mounted to the assembly's segments 20 may be inserted in an axial direction into the space circumferentially surrounded by the tire's cavity. As further depicted in FIG. 4, due to the relatively small diameter of the segments 20 in their collapsed position, excess material of the ring 10 is supported by the fingers 30. In particular, such excess material is wrapped around the radially inner surface of the fingers 30, e.g. in the form of loops or slings.

Figure 5:
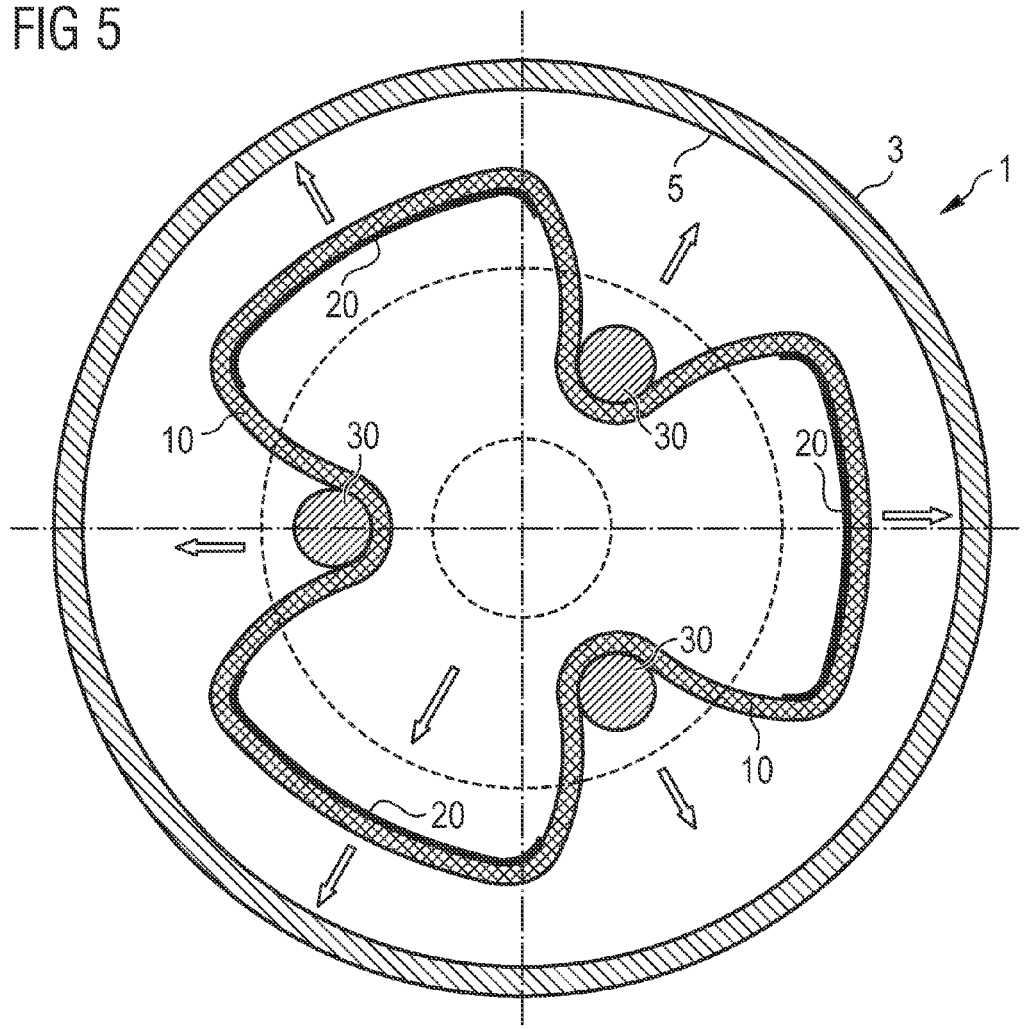
FIG. 5 is a schematic view of the arrangement of FIG. 4 wherein the segments and fingers have been expanded in an outer radial direction (the tire's sidewalls are not depicted)

Corresponding to FIG. 2, FIG. 5 shows the assembly in a partially expanded position, the segments 20 and fingers 30 have been moved in an outer radial direction. It is an option that the fingers 30 are resiliently mounted and biased in a radial direction. Thus, movement of the segments 20 into an outer radial direction may pull the segments against the force of resilient means by the ring 10 into an outer radial direction. Alternatively, the fingers 30 may be actively driven in an outer radial direction. The exact relative position between the segments 20 and the fingers 30 depends on the tire's size and/or section.

Figure 6:
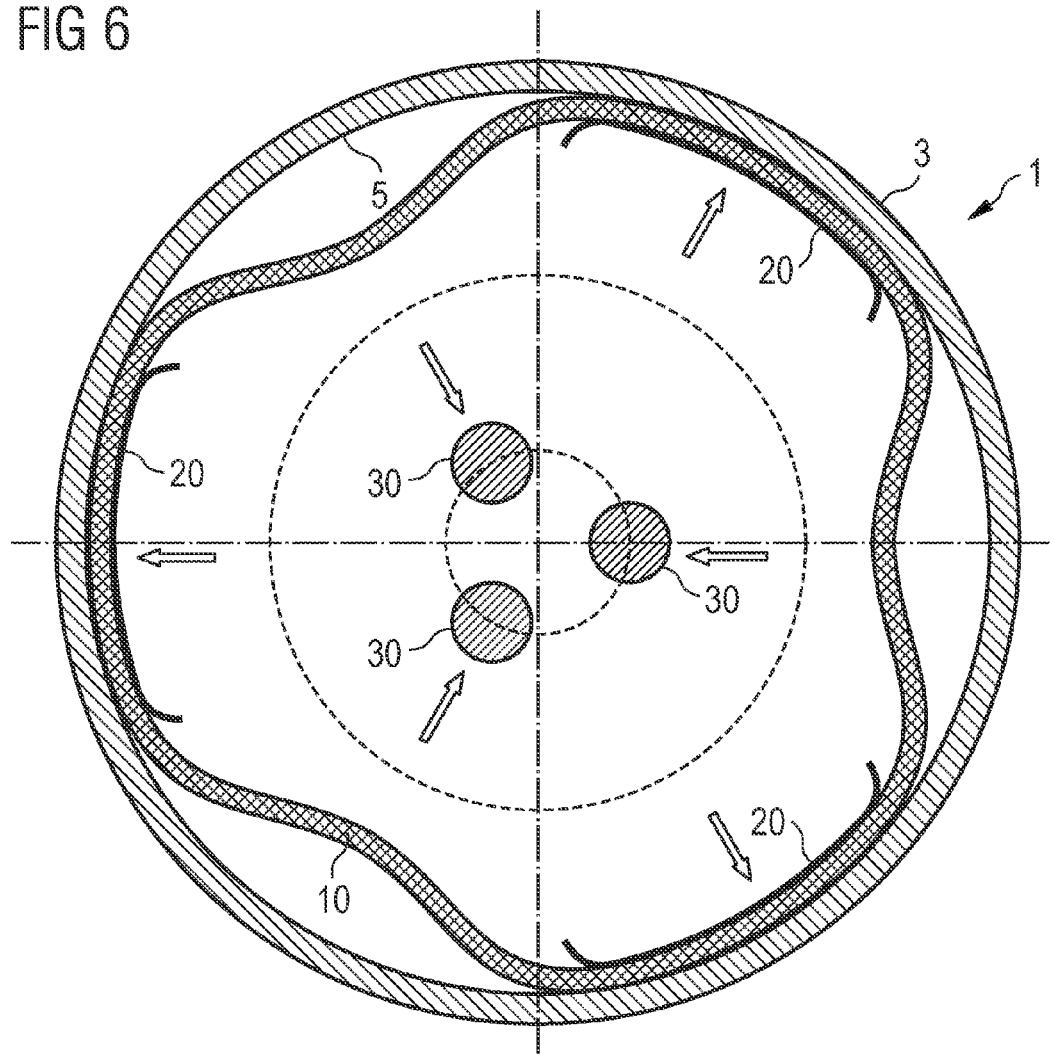
FIG. 6 is a schematic view of the arrangement of FIGS. 4 and 5 wherein the segments press the annular strip onto the tire's inner radial surface and wherein the fingers have been retracted to a radial inner position.

According to FIG. 6, the expandable segments 20 have reached their expanded position in which the ring 10 is pressed against the innerliner 5 of the tire 1. Preferably, the ring 10 is arranged in parallel to the equatorial plane of the tire 1. Further, the ring may be centered with respect to that plane. As depicted already in FIG. 4, the fingers 30 have been retracted to a radially inner position. For example, such retraction may be accomplished by a retraction in an axial direction or by a pivoting movement into the axial direction. Such a movement may e.g. be achieved via resilient means which allow for a tilting movement of the fingers 30 when the ring 10 is moved in the outer radial direction. Although the segments 20 press the ring 10 via their radially outer surface against the tire's innerliner 5, parts of the ring 10 arranged between two neighboring segments 20 may not be firmly attached to the innerliner 5 yet.

Figure 7:
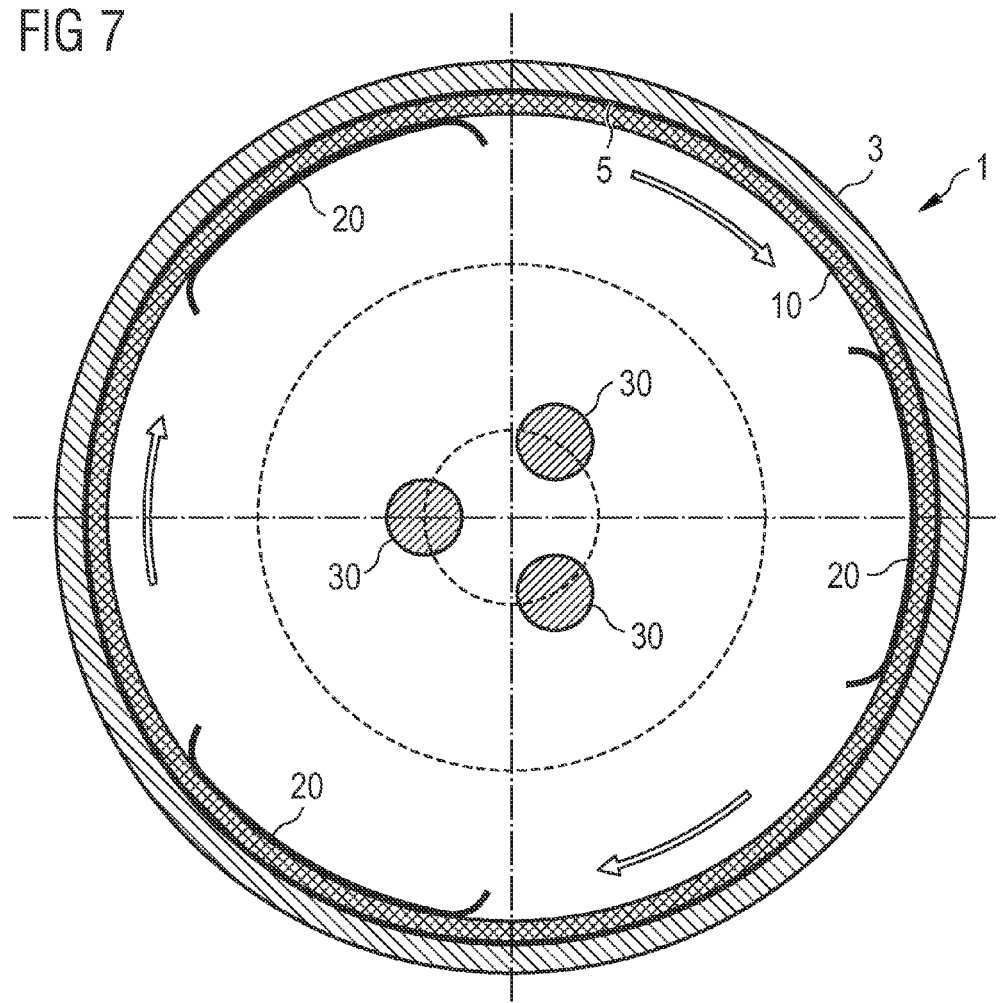
FIG. 7 is a schematic view of the arrangement of FIGS. 4 to 6 wherein the segments have been rotated to press the annular strip onto the tire's inner surface over the whole circumferential direction.

In order to provide a full contact between the ring 10 and the innerliner 5, the segments 20 and/or the fingers 30, i.e. the whole arrangement may be rotatable about the tire's axis. For example, as shown in FIG. 7, the assembly has been rotated in a clockwise direction such that the ring 10 is pressed over its full circumference onto the tire's innerliner 5. Preferably, the rotation is carried out in sequentially both directions, i.e. clockwise and counter-clockwise. However, one of both rotations may be sufficient. Alternatively, the segments 20 might be retracted first in an inner radial direction. After a rotation of the segments 20 or the arrangement the segments are pressed again on the ring 10. Preferably, the range of rotation corresponds at least to the circumferential length of the segments' radially outer surfaces.

Figure 8:
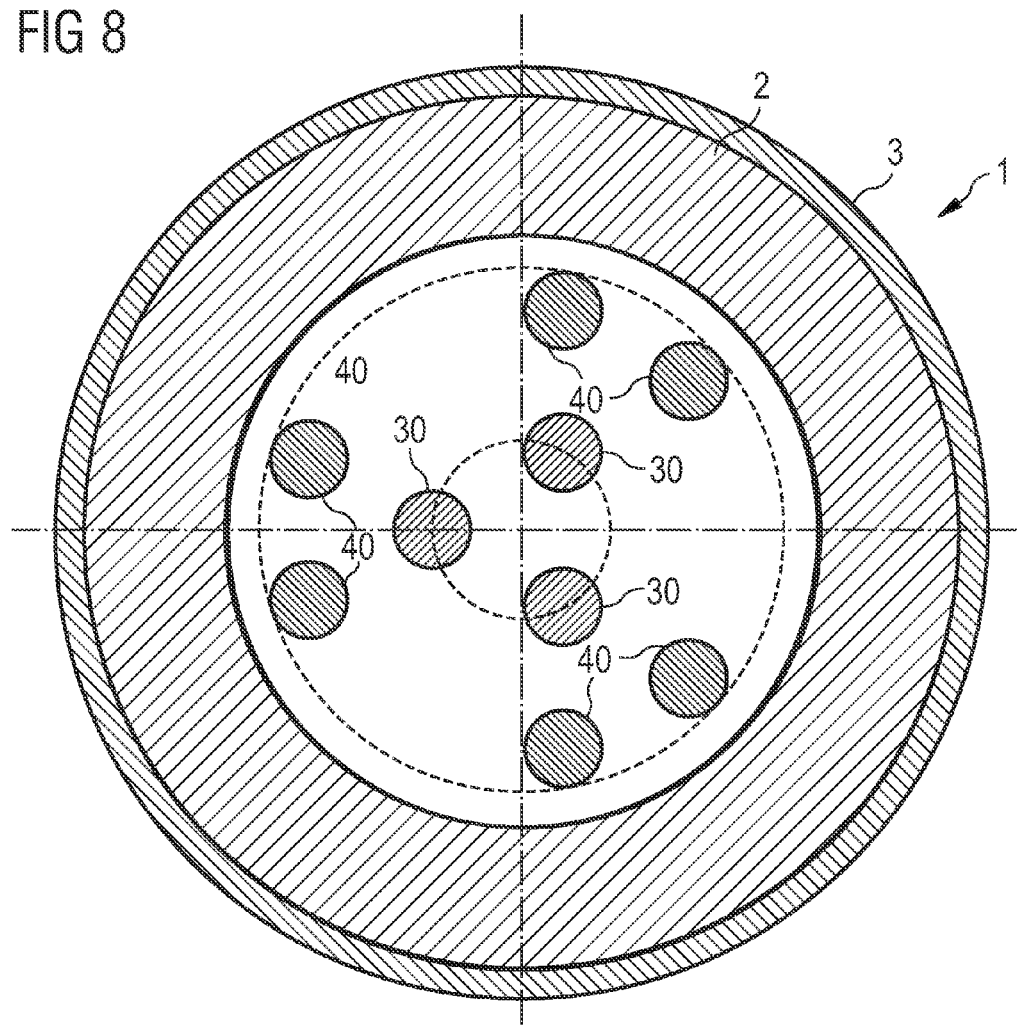
FIG. 8 is a schematic view of an alternative arrangement wherein the expandable segments comprise each two rolls.

FIG. 8 shows another example of a possible arrangement for applying a ring 10 (not depicted) to an inner surface of a tire 1. The arrangement corresponds to the arrangement according to the aforementioned Figures but each segment 40 comprises a pair of parallel rolls 40 rotatable about a radial direction. Each pair of rolls 40 may be movable in a radial direction between a collapsed position and an expanded position. In particular, if rolls 40 are provided as segments, a rotation similar to that depicted in FIG. 7 may result in less undesired forces acting on the ring 10 to be pressed onto the innerliner 5. However, sheet-like segments 20 as depicted in FIGS. 1 to 7 may allow a preferable initial placement of the ring on the innerliner 5.

The sheet-like segments 20, the rolls 40 and/or the fingers 30 may have each a slot extending substantially in a circumferential direction in order to support the ring 10 in an axial direction. Alternatively, an annulus may be provided to support the ring 10, e.g. against the gravitational force. However, slots or annuli are not mandatory. For example, the ring 10 may be held on the arrangement via tension and/or friction. Alternatively, the application of the ring 10 may be carried out with the tire's axis extending in an essentially horizontal direction.

Figure 9:
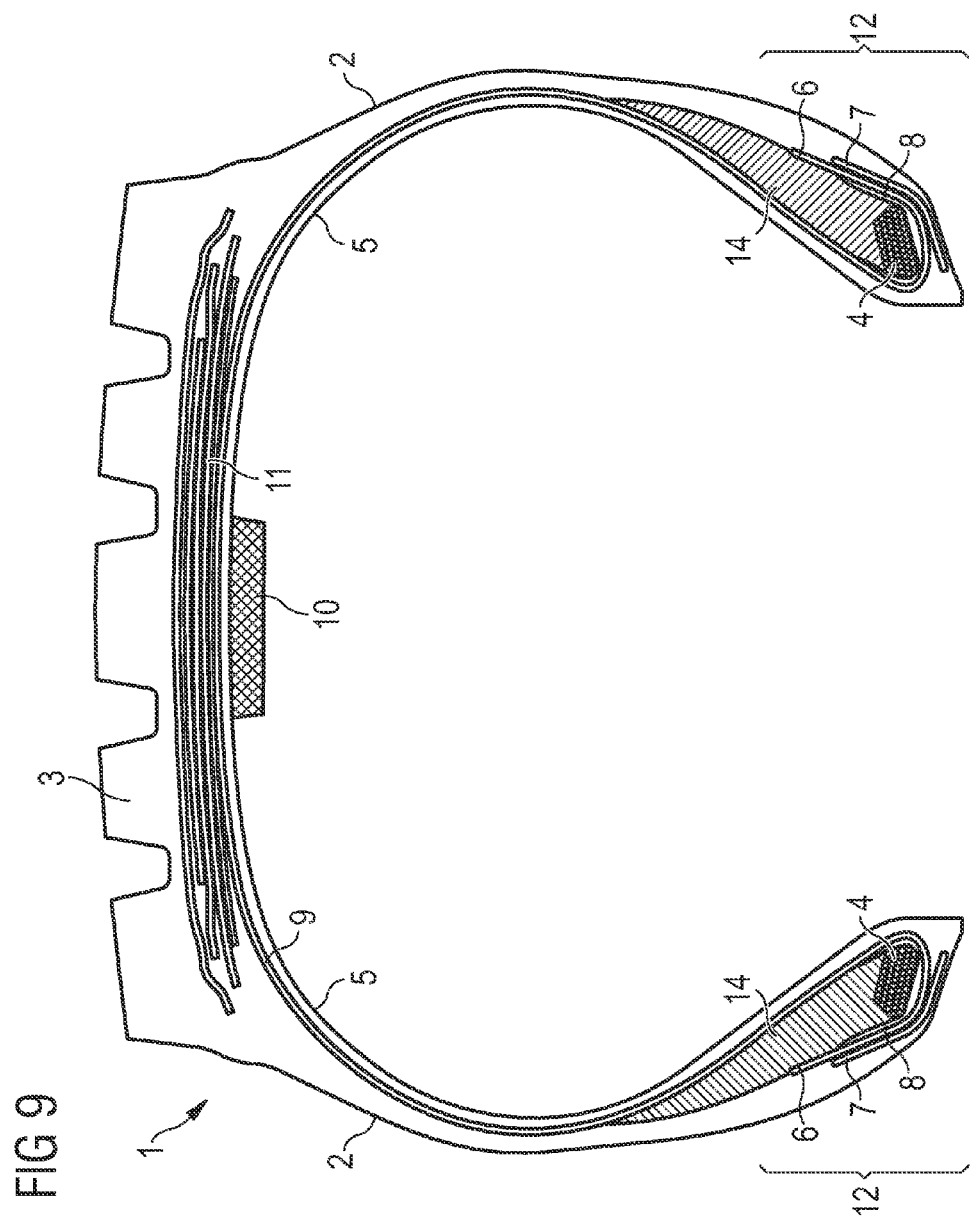
FIG. 9 is a schematic cross section of a tire in a plane perpendicular to the equatorial plane of the tire showing an annular strip applied to the tire's innerliner.

FIG. 9 shows a schematic cross section of a tire 1 according to a preferred embodiment of the invention. The tire 1 has a tread 3, an inner liner 5, a belt structure 11 comprising four belts, a carcass ply 9, two sidewalls 2, and two bead regions 12 comprising bead filler apexes 5 and beads 14. The example tire 1 is suitable, for example, for mounting on a rim of a vehicle, e.g. a truck or a passenger car. The carcass ply 9 includes a pair of axially opposite end portions 6, each of which is secured to a respective one of the beads 14. Each axial end portion 6 of the carcass ply 9 is turned up and around the respective bead 14 to a position sufficient to anchor each axial end portion 6. For example, the carcass ply 9 may be a rubberized ply having a plurality of substantially parallel carcass reinforcing members made of such material as polyester, rayon, or similar suitable organic polymeric compounds. The turned up portions 6 of the carcass ply 9 may engage the axial outer surfaces of two flippers 8 and axial inner surfaces of two chippers 7. Further, the tread 3 has multiple circumferential grooves.

An annular strip 10 or in particular a foam ring 10 is attached to the innerliner 5 in a circumferential direction. For example, the ring 10 may be applied according to the methods and/or with the apparatuses described herein above.

Figure 10:
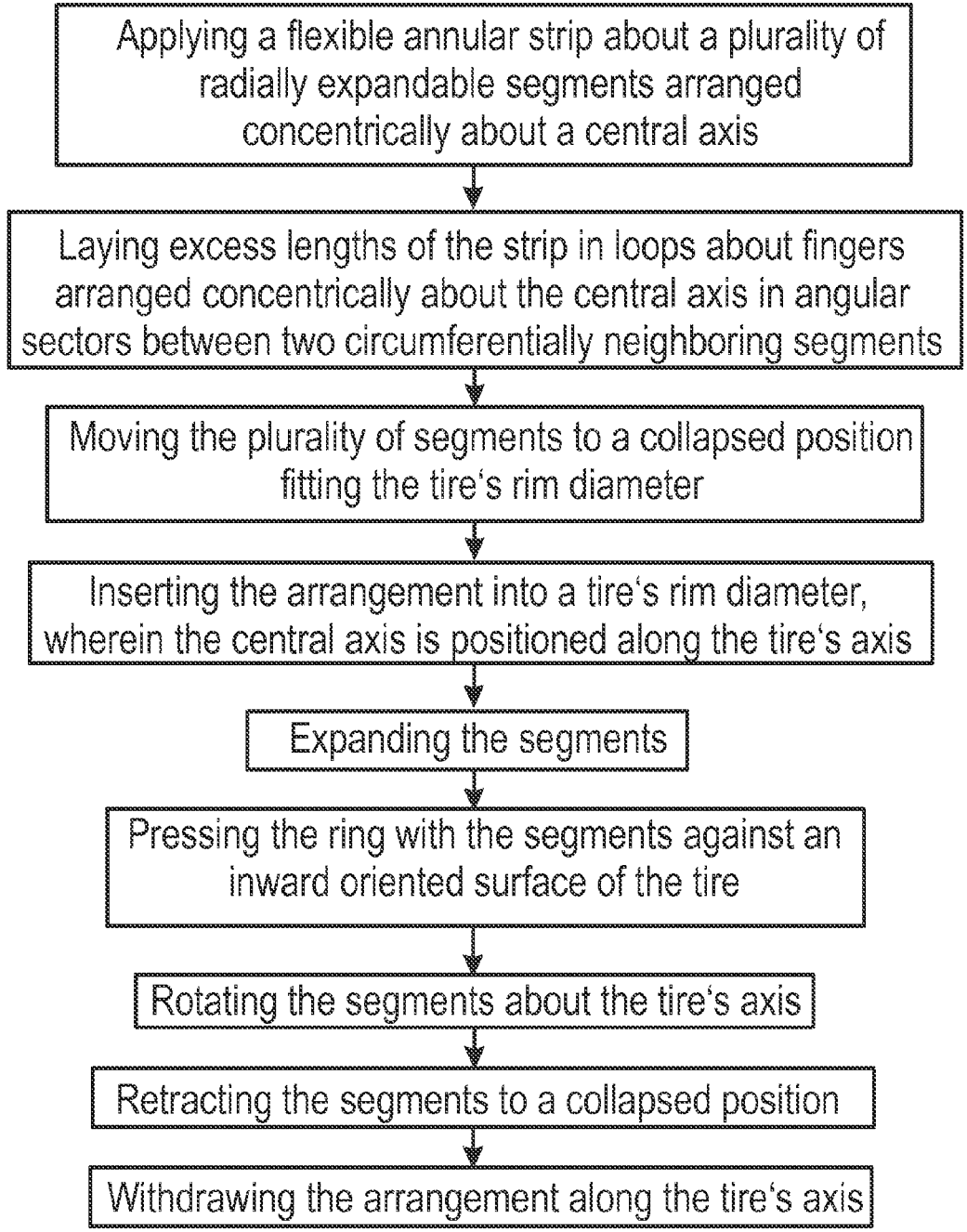
FIG. 10 is a schematic flowchart showing examples of possible method steps according to an aspect of the present invention.

FIG. 10 shows exemplary method steps for the application of an annular strip or a ring 10 to the tire's inner circumferential surface. However, the steps shown in FIG. 10 shall not be understood in a limiting sense.

In a first possible step the plurality of segments 20, 40 may be expanded to a partially expanded position so that the ring 10 may be applied to the outer radial surfaces of the segments 20, 40. However, it is also possible that the segments 20, 40 are provide in a first step in a fully expanded position or in a collapsed position in order to apply the ring 10 about the outer surfaces of the segments 20, 40.

Depending on the degree of expansion of the segments 20, 40 excess lengths of the ring 10 may exist between to neighboring segments 20, 40. Such excess lengths can be wound in loops or slings about the fingers 30 of the arrangement. As described above, the fingers 30 are provided in angular sections between two neighboring segments 20, 40. In general, the fingers 30 are provideable in a radial position which is radially closer to the tire's axis than the positions of the segments 20, 40.

If the segments 20, 40 are in an at least partially expanded position, they may be moved in a next step to the collapsed position so that the arrangement fits into a tire's rim diameter. If the arrangement is already in the collapsed position, the step may be omitted. Inserting the arrangement into the tire's rim diameter may be carried out by putting the tire 1 about the arrangement or by moving the arrangement into the tire's rim diameter. Such steps may be carried out manually or automatically.

In general, a further optional step may be directed to the application of an adhesive to the radially outer surface of the ring. Such a step may be carried out before any of the above mentioned steps. Alternatively, an adhesive may be applied to the tire's innerliner. Preferably, the application of an adhesive is carried out before inserting the arrangement into the tire's rim diameter. As a further alternative, a double sided adhesive tape may be attached to the radially out circumference of the strip or to the tire's innerliner. Such a step may also be carried out between or before the above mentioned method steps.

Once the arrangement is situated in the tire's rim diameter, the segments may be expanded in an outer radial direction. In particular, the segments move then between both opposite sidewalls 2 of the tire 1 in the direction of the tire's tread 3.

Upon further expansion, the segments 20, 40 will press the ring 10 against the innerliner 5 of the tire 1. Then the adhesive glues the ring 10 to the tire's innerliner 5 at least in the region or angular sectors of the segments 20, 40.

If a complete circumferential adhesion of the ring 10 is desired, the segments 20, 40 may be rotated about the tire's axis in order to glue also lengths of the ring 10 which have not been placed on the segments 20, 40 to the tire's innerliner 5. Alternatively, the segments 20, 40 may be partially retracted, then rotated and expanded again to press lengths of the ring 10 to the innerliner 5.

Afterwards, the segments may be retracted to a collapsed position and the arrangement may be withdrawn from the tire 1. Preferably, this is achieved in an axial direction.

To deform easily during running and not to affect considerably the running performance such as steering stability, the material of the annular strip 10 is preferably a light-weight low-density flexible material, e.g., foamed rubber, foamed synthetic resins, cellular plastics and the like. In the case of foamed materials (or sponge materials), an open-cell type and a closed-cell type can be used, but an open-cell type is preferred. For example, synthetic resin foams such as ether based polyurethane foam, ester based polyurethane foam, polyethylene foam and the like; rubber foams such as chloroprene rubber foam, ethylene-propylene rubber foam, nitrile rubber foam, silicone rubber foam and the like can be used. Especially, polyethylene foam, polyurethane foams including ether based polyurethane foam and the like are preferably used in view of noise damping effect, lightness in weight, easy control of expansion rate and durability.

The annular strip 10 is typically an open-cell foam material consisting of polyurethane (PU) foam which can either be of a polyester or polyethene type. In one embodiment, the ring 10 has a density in a range from 0.010 to 0.040 gram/cm$^3$.

Depending on the environment where the tire 1 is used, there is a possibility that the air which fills the tire cavity to inflate the tire is humid and the water makes condensation in the closed cavity. Accordingly, foam materials which are hard to be hydrolyzed such as ether based polyurethane may be optionally used.

Further, in order to prevent water from penetrating into the annular strip 10, a water repellent treatment can be preferably made on the strip material. Also, a mildew proof treatment can be preferably made.

Furthermore, if the strip 10 is made of a foam material, in order to avoid poison in the emission gas generated when incinerating scrap tires, it is preferred that raw materials not including halogen are used to make the foam material.

By disposing a certain volume of the foam material in the tire cavity, resonances of the air in the cavity can be controlled and vibrations of the tread portion are reduced. Thus, the foam material may act as a damper. Noise generated from the tire during running can be reduced. In particular, reduction of noise due to tire cavity resonance measured at a frequency of 180 to 300 Hz is desirable.

Useful adhesives according to aspects of the invention may be for example silicone adhesives. Silicone adhesives are known to a person skilled in the art, for example, from European Patent Application Nos. EP 0 118 030 A, EP 0 316 591 A, EP 0 327 847 A, and EP 0 553 143 A, German Patent Application No. DE 195 49 425 A, and U.S. Pat. No. 4,417,042. However, other adhesives may be used depending on the materials to be glued together.

Silicone adhesives offer sufficiently good adhesion on a surface contaminated by demolding agents such as used in the tire vulcanizing process (bladder release lubricants or agents). Adhesion is considered as sufficient when adhesion to the innerliner is high enough to prevent foam from detaching during tire life time; although there is no upper limit, it is not required that the adhesion exceeds the tear resistance of the foam to adhesive interface or the foam itself. Additionally the adhesive should remain elastic during tire life time and be resistant to fatigue under flexing and shearing. Adhesives which fulfill these requirements are for example of the Loctite® 5900 series including 5900, 5910 and 5970 from Henkel.

Cleaning of a tire's innerliner surface before application of a silicone adhesive is optional. For example, the surface may be cleaned using a hot water high pressure (HWHP) water jet at about 6° C. and up to 90 bar. Mechanical cleaning (grinding, buffing) is not needed.

If the annular strip 10 is made of foam, such a ring may be applied to cured tires and the innerliner surface may or may not feature a smooth portion. The smooth portion, if present, results from the fact that tire curing bladders are typically ground at their center to remove imperfections and flash resulting from the bladder production process. For tires to be equipped with a foam noise damper, tire curing bladders having a smooth portion wider than about 50% of the damper width (i.e., less or equal to about 60 mm) may be used. A foamed noise damper of the tire is of such a gauge as to not occupy any substantial inner portion of the inflated tire.

In some aspects the applied annular strip or ring 10 has been described as being made of foam or solid foam. However, depending on the application other materials may be used, as for example rubber compositions, plastics and/or fabrics. Further, the strip or ring 10 has been described as noise damper but it may have also other purposes.

The invention has been described with reference to best modes of carrying out the invention. Obviously, modifications and alterations will occur to others upon a reading and understanding of this specification. It is intended to include all such modifications and alterations in so far as they come within the scope of the appended claims or the equivalents thereof.

In any case the above described embodiments shall not be understood in a limiting sense. In particular, the features of the above embodiments may also be replaced or combined with one another.

The invention claimed is:

1. A method for applying a flexible annular strip to a radially inward oriented surface of a tire, the method comprising the steps of:
    providing three segments arranged about a central axis,
        each segment being movable between a collapsed radial position and an expanded radial position and having a radially outer surface for supporting at least a part of a length of the annular strip, wherein each segment has an outwardly curved sheet having a convexity facing the radially inward surface of the tire for supporting the annular strip and circumferential ends bent toward a radial inner direction, and wherein the curvature of each sheet matches the circumferential curvature of the inward oriented surface of the tire;

providing three fingers arranged about the central axis and extending in a direction parallel to that axis, wherein each finger is movable axially by a retraction in a direction parallel to the central axis and movable radially between an inner radial position and an outer radial position, and wherein each angular area between two circumferentially neighboring segments is provided with one of the fingers;

placing the annular strip about the radially outer surfaces of the segments when the segments are in their collapsed radial position;

placing excess lengths of the annular strip between every circumferentially adjacent pair of segments about a radially inner surface of the fingers provided in the angular areas between these neighboring segments when the fingers are in their inner radial position;

inserting the three fingers and the three segments supporting the annular strip into the tire's rim diameter with the central axis being positioned along the tire's axis;

expanding each segment in an outer radial direction towards the expanded radial positions of the segments;

refracting the fingers before the segments press the strip onto the inward oriented surface of the tire, wherein each of the fingers are initially positioned at their radially inner position and moved towards their outer radial position such that as the expandable segments have reached a partially expanded position the fingers are withdrawn from the ring by refraction in the axial direction parallel to the central axis and moved to their inner radial position prior to the ring being pressed against the radially inward oriented surface of the tire by the fully expanded segments; and pressing the annular strip with the segments against the radially inward oriented surface of the tire, and wherein after pressing the annular strip against the inward oriented surface of the tire with the segments, the three segments are retracted in a radially inward direction and rotated about the tire's axis by an amount corresponding to a circumferential length of the segments and then expanding each segment radially to press the excess lengths of the annular strip against the inward oriented surface of the tire.

2. The method of claim 1, wherein the fingers are biased towards the central axis.

3. The method according to claim 1, wherein an adhesive is applied to the inward oriented surface of the tire before pressing the annular strip with the expandable segments against the radially inward surface of the tire surface, or wherein an adhesive is applied to the strip before placing the strip about the radially outer surfaces of the segments.

4. The method according to claim 1, wherein the annular strip is a foam strip.

5. The method according to claim 1, wherein the annular strip is one of the following: formed integrally; formed by a band having two ends glued to each other before being placed on the expandable segments; or formed by a band having two ends fused together before being placed on the expandable segments.

6. The method of claim 1, wherein the segments are expanded or collapsed by actuator means being selected from one or more of: pneumatic, hydraulic or electric actuators.

* * * * *